US011912363B2

(12) United States Patent
Hara

(10) Patent No.: US 11,912,363 B2
(45) Date of Patent: Feb. 27, 2024

(54) CONTROL DEVICE FOR TELESCOPIC APPARATUS

(71) Applicant: Shimano Inc., Osaka (JP)

(72) Inventor: Nobukatsu Hara, Osaka (JP)

(73) Assignee: Shimano Inc., Osaka (JP)

( * ) Notice: Subject to any disclaimer, the term of this patent is extended or adjusted under 35 U.S.C. 154(b) by 1100 days.

(21) Appl. No.: 16/700,101

(22) Filed: Dec. 2, 2019

(65) Prior Publication Data

US 2020/0269941 A1 Aug. 27, 2020

(30) Foreign Application Priority Data

Feb. 22, 2019 (DE) ..................... 10 2019 104 575.4

(51) Int. Cl.
*B62J 1/08* (2006.01)
*B62K 25/04* (2006.01)
*B62K 25/28* (2006.01)
*B62K 25/30* (2006.01)

(52) U.S. Cl.
CPC .............. *B62J 1/08* (2013.01); *B62K 25/286* (2013.01); *B62K 25/30* (2013.01); *B62J 2001/085* (2013.01); *B62K 2025/044* (2013.01)

(58) Field of Classification Search
CPC . B62J 1/08; B62J 2001/085; B62K 2025/044; B62K 25/286; B62K 25/30
See application file for complete search history.

(56) References Cited

U.S. PATENT DOCUMENTS

| 6,050,583 | A | 4/2000 | Bohn | |
| 6,612,599 | B2 | 9/2003 | Miyoshi | |
| 8,286,982 | B2 | 10/2012 | Plantet et al. | |
| 8,825,322 | B1* | 9/2014 | Ikemoto | B62M 25/08 |
| | | | | 280/282 |
| 9,199,690 | B2 | 12/2015 | Watarai | |
| 9,540,067 | B2* | 1/2017 | Chen | B62K 25/00 |
| 9,676,441 | B2 | 6/2017 | Chen et al. | |
| 11,001,323 | B2* | 5/2021 | Kurokawa | B62J 45/413 |
| 11,130,548 | B2* | 9/2021 | Shahana | B62M 9/04 |
| 11,498,641 | B2* | 11/2022 | Tsuchizawa | B62K 25/286 |
| 2006/0064223 | A1* | 3/2006 | Voss | B62K 25/04 |
| | | | | 701/52 |
| 2010/0276906 | A1* | 11/2010 | Galasso | F16F 9/065 |
| | | | | 188/266.2 |
| 2019/0009852 | A1* | 1/2019 | Shirai | B62J 1/08 |

FOREIGN PATENT DOCUMENTS

| DE | 20 2015 102 757 U1 | 7/2015 |
| DE | 10 2017 208 291 A1 | 11/2017 |
| DE | 10 2017 213 606 A1 | 2/2018 |

* cited by examiner

*Primary Examiner* — Tony H Winner
(74) *Attorney, Agent, or Firm* — Global IP Counselors, LLP

(57) ABSTRACT

A control device is configured to control a telescopic apparatus that is provided on a human-powered vehicle. The control device includes at least one sensor and an electronic controller. The at least one sensor is configured to detect an operating condition of the human-powered vehicle. The operating condition includes at least two of a sitting condition of a rider, a power input to the human-powered vehicle, and a forward speed of the human-powered vehicle. The electronic controller is configured to selectively control the telescopic apparatus of the human-powered vehicle in accordance to the operating condition.

16 Claims, 8 Drawing Sheets

CONTROL DEVICE FOR TELESCOPIC APPARATUS

CROSS-REFERENCE TO RELATED APPLICATIONS

This application claims priority to German Patent Application No. 10 2019 104 575.4, filed on Feb. 22, 2019. The entire disclosure of German Patent Application No. 10 2019 104 575.4 is hereby incorporated herein by reference.

BACKGROUND

Technical Field

The present invention generally relates to a control device for controlling a telescopic apparatus.

Background Information

When operating a human-powered vehicle, it may be desirable to adjust components of the human-powered vehicle according to an operating condition of the vehicle. For example, a position of the seatpost or the suspension may be moved when a rider rises from the seat or when a change in forward speed is detected. The adjustment of such components may be accomplished by use of a control device of the telescopic apparatus.

SUMMARY

It is desirable that the rider can ride a human-powered vehicle comfortably in various operating conditions of the vehicle. One object of the present invention to adjust at least one component of a human-powered vehicle according to an operating condition of the vehicle.

A control device for controlling a telescopic apparatus of a human-powered vehicle is disclosed herein. In accordance with a first aspect of the present invention, the control device comprises at least one sensor and an electronic controller. The at least one sensor is configured to detect an operating condition of the human-powered vehicle. The operating condition includes at least two of a sitting condition of a rider, a power input to the human-powered vehicle, and a forward speed of the human-powered vehicle. The electronic controller is configured to selectively control the telescopic apparatus of the human-powered vehicle in accordance to the operating condition.

With the control device according to the first aspect, it is possible to selectively control the telescopic apparatus of the human-powered vehicle according to the current operating condition of the human-powered vehicle. With the control device according to the first aspect, it is possible to selectively control the telescopic apparatus of the human-powered vehicle according to the current operating condition of the human-powered vehicle. This configuration can be advantageous, as it allows the telescopic apparatus to be controlled when the sitting condition, power input, and/or forward speed change, thereby providing the rider with an optimized configuration of the telescopic apparatus and better control of the human-powered vehicle.

In accordance with a second aspect of the present invention, the electronic controller of the control device according to the first aspect is configured to selectively control the telescopic apparatus in accordance to a comparison between the sitting condition of the rider and a predetermined condition.

With the control device according to the second aspect, it is possible to selectively control the telescopic apparatus according to a comparison between the sitting condition and a predetermined condition of the human-powered vehicle. This configuration has the potential benefit of setting the telescopic apparatus according to whether the rider is sitting, which can provide the rider with better control of the human-powered vehicle.

In accordance with a third aspect of the present invention, the electronic controller of the control device according to the first or second aspect is configured to selectively control the telescopic apparatus in accordance to a comparison between the power input and a threshold power value.

With the control device according to the third aspect, it is possible to selectively control the telescopic apparatus according to a comparison between the power input and a threshold power value of the human-powered vehicle. This configuration has the potential benefit of setting the telescopic apparatus according to whether the power input is larger than a threshold power value, which can provide the rider with better control of the human-powered vehicle.

In accordance with a fourth aspect of the present invention, the electronic controller of the control device according to any one of the first to third aspects is configured to selectively control the telescopic apparatus in accordance to a comparison between the forward speed and a threshold speed value.

With the control device according to the fourth aspect, it is possible to selectively control the telescopic apparatus according to a comparison between the forward speed and a threshold speed value of the human-powered vehicle. This configuration has the potential benefit of setting the telescopic apparatus according to whether the forward speed of the human-powered vehicle is larger than a threshold speed value, which can provide the rider with better control of the human-powered vehicle.

In accordance with a fifth aspect of the present invention, the operating condition of the control device according to any one of the first to fourth aspects further includes an additional operating condition. The addition operating condition includes at least one of a cadence, a condition of an additional telescopic apparatus, and a seat height of the human-powered vehicle.

With the control device according to the fifth aspect, it is possible to selectively control the telescopic apparatus of the human-powered vehicle according to the current operating condition of the human-powered vehicle. This configuration can be advantageous, as it allows the telescopic apparatus to be controlled when the cadence and/or the condition of an additional telescopic apparatus and/or the seat height change, thereby providing the rider with an optimized configuration of the telescopic apparatus and better control of the human-powered vehicle.

In accordance with a sixth aspect of the present invention, the electronic controller of the control device according to the fifth aspect is configured to selectively control the telescopic apparatus in accordance to a comparison between the cadence and a threshold cadence value.

With the control device according to the sixth aspect, it is possible to selectively control the telescopic apparatus according to a comparison between the cadence and a threshold cadence value of the human-powered vehicle. This configuration has the potential benefit of setting the telescopic apparatus according to whether the cadence of the human-powered vehicle is larger than a threshold cadence value, which can provide the rider with better control of the human-powered vehicle.

In accordance with a seventh aspect of the present invention, the electronic controller of the control device according to the fifth or sixth aspect is configured to selectively control the telescopic apparatus in accordance to a comparison between the condition of an additional telescopic apparatus and a predetermined condition.

With the control device according to the seventh aspect, it is possible to selectively control the telescopic apparatus according to a comparison between the condition of an additional telescopic apparatus and a predetermined condition of the human-powered vehicle. This configuration has the potential benefit of setting the telescopic apparatus according to whether the condition of an additional telescopic apparatus is different than a predetermined condition, which can provide the rider with better control of the human-powered vehicle.

In accordance with an eighth aspect of the present invention, the electronic controller of the control device according any one of the fifth to seventh aspects is configured to selectively control the telescopic apparatus in accordance to a comparison between the seat height position and a predetermined position.

With the control device according to the eighth aspect, it is possible to selectively control the telescopic apparatus according to a comparison between the seat height position and a predetermined position of the human-powered vehicle. This configuration has the potential benefit of setting the telescopic apparatus according to whether the seat height position is higher or lower than a predetermined position, which can provide the rider with better control of the human-powered vehicle.

In accordance with a ninth aspect of the present invention, the control device according to any one of the first to eighth aspects further comprises a mode selector configured to set the electronic controller to select one of a plurality of setting modes. Each of the setting modes correlates to a different state of the telescopic apparatus, and the electronic controller is configured to control the telescopic apparatus in a manner that corresponds to a selected one of the setting modes.

With the control device according to the ninth aspect, it is possible to control the state of the telescopic apparatus to correspond to a setting mode via the mode selector. This configuration can be advantageous, as it allows the telescopic apparatus to be controlled with respect to a current implementation of the human-powered vehicle, thereby providing the rider with an optimized configuration of the telescopic apparatus and better control of the human-powered vehicle.

In accordance with a tenth aspect of the present invention, a control device for controlling a telescopic apparatus of a human-powered vehicle comprises a mode selector. The mode selector is configured to set an electronic controller to select one of a plurality of setting modes. Each of the setting modes correlates to a different state of the telescopic apparatus, and the electronic controller is configured to control the telescopic apparatus in a manner that corresponds to the selected setting mode.

With the control device according to the tenth aspect, it is possible to control the state of the telescopic apparatus to correspond to a setting mode via the mode selector. This configuration can be advantageous, as it allows the telescopic apparatus to be controlled with respect to a current implementation of the human-powered vehicle, thereby providing the rider with an optimized configuration of the telescopic apparatus and better control of the human-powered vehicle.

In accordance with an eleventh aspect of the present invention, the electronic controller of the control device according to any one of the first to ninth aspects of is configured to set the telescopic apparatus to one of a plurality of operating states.

With the control device according to the eleventh aspect, it is possible to set the telescopic apparatus to an operating state. This configuration can be advantageous, as it allows the telescopic apparatus to be controlled with respect to a current combination of operating conditions of the human-powered vehicle, thereby providing the rider with an optimized configuration of the telescopic apparatus and better control of the human-powered vehicle.

In accordance with a twelfth aspect of the present invention, the plurality of operating states of the control device according to the eleventh aspect includes a first operating state, a second operating state, and a third operating state. The first, second and third operating states are different operating states.

With the control device according to the twelfth aspect, it is possible to set the telescopic apparatus to a first operating state, a second operating state, or a third operating state. This configuration can be advantageous, as it allows the telescopic apparatus to be controlled with respect to a current combination of operating conditions of the human-powered vehicle, thereby providing the rider with an optimized configuration of the telescopic apparatus and better control of the human-powered vehicle.

In accordance with a thirteenth aspect of the present invention, the telescopic apparatus of the control device according to the twelfth aspect includes a first tube and a second tube telescopically moved with respect to the first tube. The second tube is restricted to move with respect to the first tube in the first operating state.

With the control device according to the thirteenth aspect, the telescopic apparatus includes a first tube and a second tube that moves with respect to the first tube, and it is possible to restrict such movement when the telescopic apparatus is in the first operating state. This configuration can be advantageous, as it allows the telescopic apparatus to be locked in response to a current combination of operating conditions of the human-powered vehicle, thereby providing the rider with an optimized configuration of the telescopic apparatus and better control of the human-powered vehicle.

In accordance with a fourteenth aspect of the present invention, the second tube of the control device according to the twelfth aspect is telescopically movable with respect to the first tube in the second operating state.

With the control device according to the fourteenth aspect, it is possible to move the second tube with respect to the first tube when the telescopic apparatus is in the second operating state. This configuration can be advantageous, as it allows the telescopic apparatus to be freely movable in response to a current combination of operating conditions of the human-powered vehicle, thereby providing the rider with an optimized configuration of the telescopic apparatus and better control of the human-powered vehicle.

In accordance with a fifteenth aspect of the present invention, the second tube of the control device according to the twelfth aspect is telescopically movable with respect to the first tube in the third operating state, and the second tube moves with a greater resistance in the third operating state compared to a resistance of the second operating state.

With the control device according to the fifteenth aspect, it is possible to move the second tube with respect to the first tube when the telescopic apparatus is in the third operating state, and to move the second tube with a greater resistance in the third operating state compared to the resistance of the second operating state. This configuration can be advantageous, as it allows the telescopic apparatus to be restrictively movable in response to a current combination of operating conditions of the human-powered vehicle, thereby providing the rider with an optimized configuration of the telescopic apparatus and better control of the human-powered vehicle.

In accordance with a sixteenth aspect of the present invention, a control system for a human-powered vehicle comprises the control device according to any one of the first to fifteenth aspects, and a telescopic apparatus which includes an adjustable suspension.

With the control system according to the sixteenth aspect, it is possible to selectively control the adjustable suspension of the human-powered vehicle according to the current operating condition of the human-powered vehicle. This configuration can be advantageous, as it allows the adjustable suspension to be controlled when one or more of the operating conditions or setting modes of the human-powered vehicle change, thereby providing the rider with an optimized configuration of the telescopic apparatus and better control of the human-powered vehicle.

In accordance with a seventeenth aspect of the present invention, a control system for a human-powered vehicle comprises the control device according to any one of the first to fifteenth aspects, and a telescopic apparatus which includes an adjustable seatpost.

With the control system according to the seventeenth aspect, it is possible to selectively control the adjustable seatpost of the human-powered vehicle according to the current operating condition of the human-powered vehicle. This configuration can be advantageous, as it allows the adjustable seatpost to be controlled when one or more of the operating conditions or setting modes of the human-powered vehicle change, thereby providing the rider with an optimized configuration of the telescopic apparatus and better control of the human-powered vehicle.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure. The term "small and/or light vehicle," as used herein, refers to electric and non-electric vehicles regardless of the number of their wheels, but does not include four-wheeled vehicles having an internal combustion engine as a power source for driving the wheels, or four-wheeled electric vehicles that require a license to operate on public roads.

According to a further aspect of the present invention, the human-powered vehicle preferably is a bicycle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF EMBODIMENTS

Figure 1:
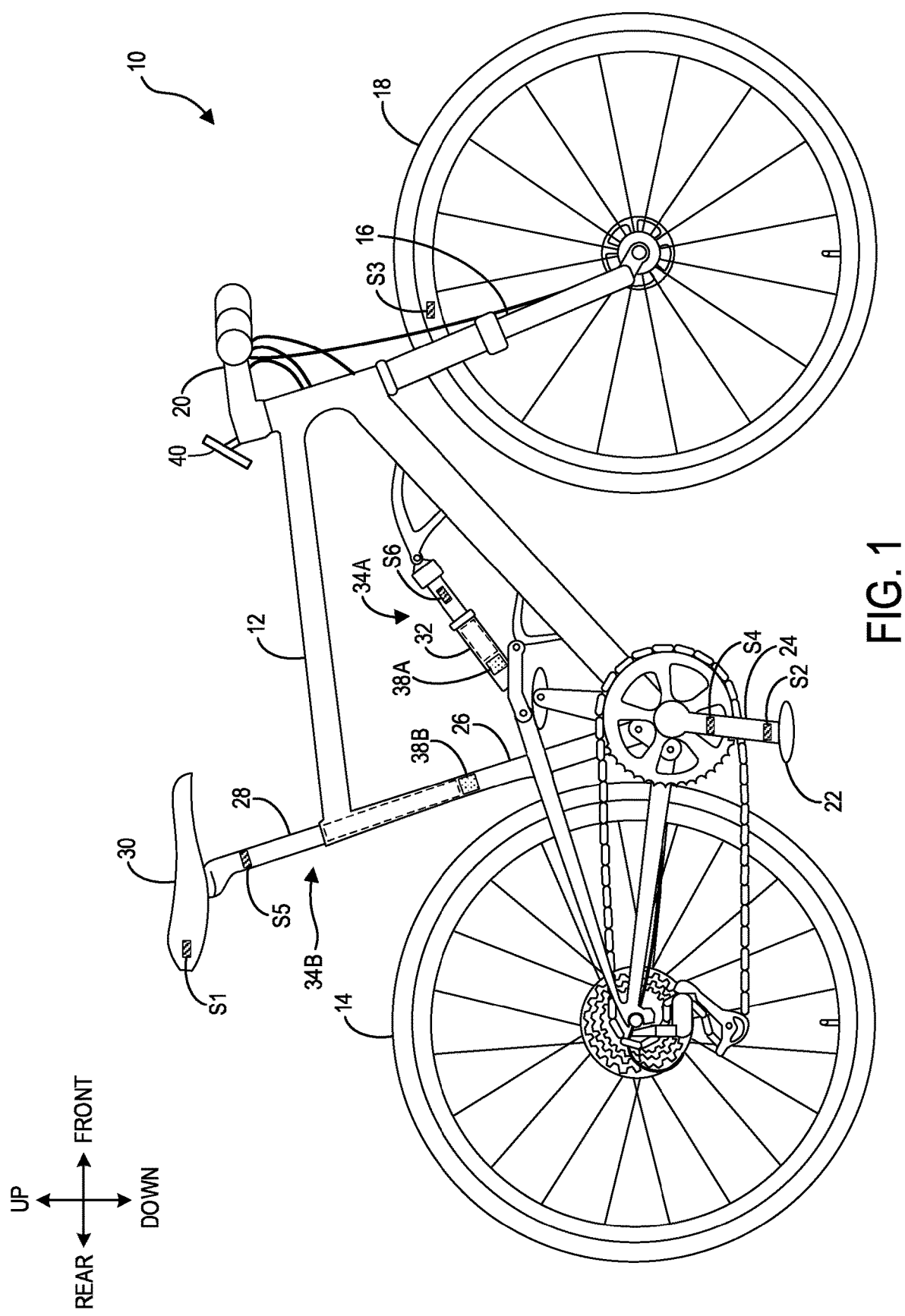
FIG. 1 is a right side elevational view of an example human-powered vehicle incorporating a control device of a telescopic apparatus according to the present disclosure.

Selected embodiments will now be explained with reference to the drawings, wherein like reference numerals designate corresponding or identical elements throughout the various drawings. It will be apparent to those skilled in the art from this disclosure that the following descriptions of the embodiments are provided for illustration only and not for the purpose of limiting the invention as defined by the appended claims and their equivalents.

Referring initially to FIG. 1, an exemplary human-powered vehicle 10 according to at least one disclosed embodiment of the present invention is shown. The human-powered vehicle 10 is, for example, an off-road bicycle such as a cyclocross bicycle or mountain bike. Alternatively, the human-powered vehicle 10 can be a road type bicycle. The following directional terms "front," "rear," "forward," "rearward," "left," "right," "transverse," "upward," and "downward," as well as any other similar directional terms, refer to those directions which are determined on the basis of a rider sitting upright on a seat of the human-powered vehicle 10 while facing a handlebar, for example.

Continuing with FIG. 1, the human-powered vehicle 10 includes a frame 12 attached to a rear wheel 14. A front fork 16 attaches a front wheel 18 to the frame 12. A handlebar 20 is attached to the frame 12 for steering the human-powered vehicle 10. Pedals 22 on either side of the human-powered vehicle 10 are attached to corresponding arms of a crank 24, and a rider can apply a driving force to the pedals 22 to propel the human-powered vehicle 10. The frame 12 includes a seat tube 26, which receives an adjustable seatpost 28 to which a seat 30 is attached. An adjustable suspension 32 is incorporated onto the frame 12. The human-powered vehicle 10 further includes a telescopic apparatus 34. In the embodiment of FIG. 1, the adjustable suspension 32 is shown as a first example of a telescopic apparatus 34A, with the dashed lines indication the telescopic nature. The adjustable seatpost 28 is shown as a second example of a telescopic apparatus 34B, with the dashed lines indicating the telescopic nature.

A control device 36 of the telescopic apparatus 34 can be provided on the human-powered vehicle, as described in detail below. The control device 36 can comprise at least one sensor S and an electronic controller 38. The at least one sensor S, shown in FIG. 1 as sensors S1, S2, S3, S4, S5, and S6, can be configured to detect an operating condition OC of the human-powered vehicle 10, as described in detail below. The electronic controller 38 can be configured to selectively control the telescopic apparatus 34 of the human-powered vehicle 10 in accordance to the operating condition OC. The electronic controller 14 is formed of one or more semiconductor chips that are mounted on a circuit board. The term "electronic controller" as used herein refers to hardware that executes a software program, and does not include a human. As shown in FIG. 1, a first example of the electronic controller 38A is depicted as controlling the telescopic apparatus 34A of the adjustable suspension 32. A second example of the electronic controller 38B is depicted as controlling the telescopic apparatus 34B of the adjustable seatpost 28. The control device 36 can further comprise a mode selector 40. As described below, the mode selector 40 can be configured to set the electronic controller 38 to select one of a plurality of setting modes SM. As shown in FIG. 1, the mode selector 40 can be implemented as a remote device, mounted, for example, on the handlebar 20, where it can be manipulated by a user. Other parts of the human-powered vehicle 10 are well known and are not described herein.

Figure 2:
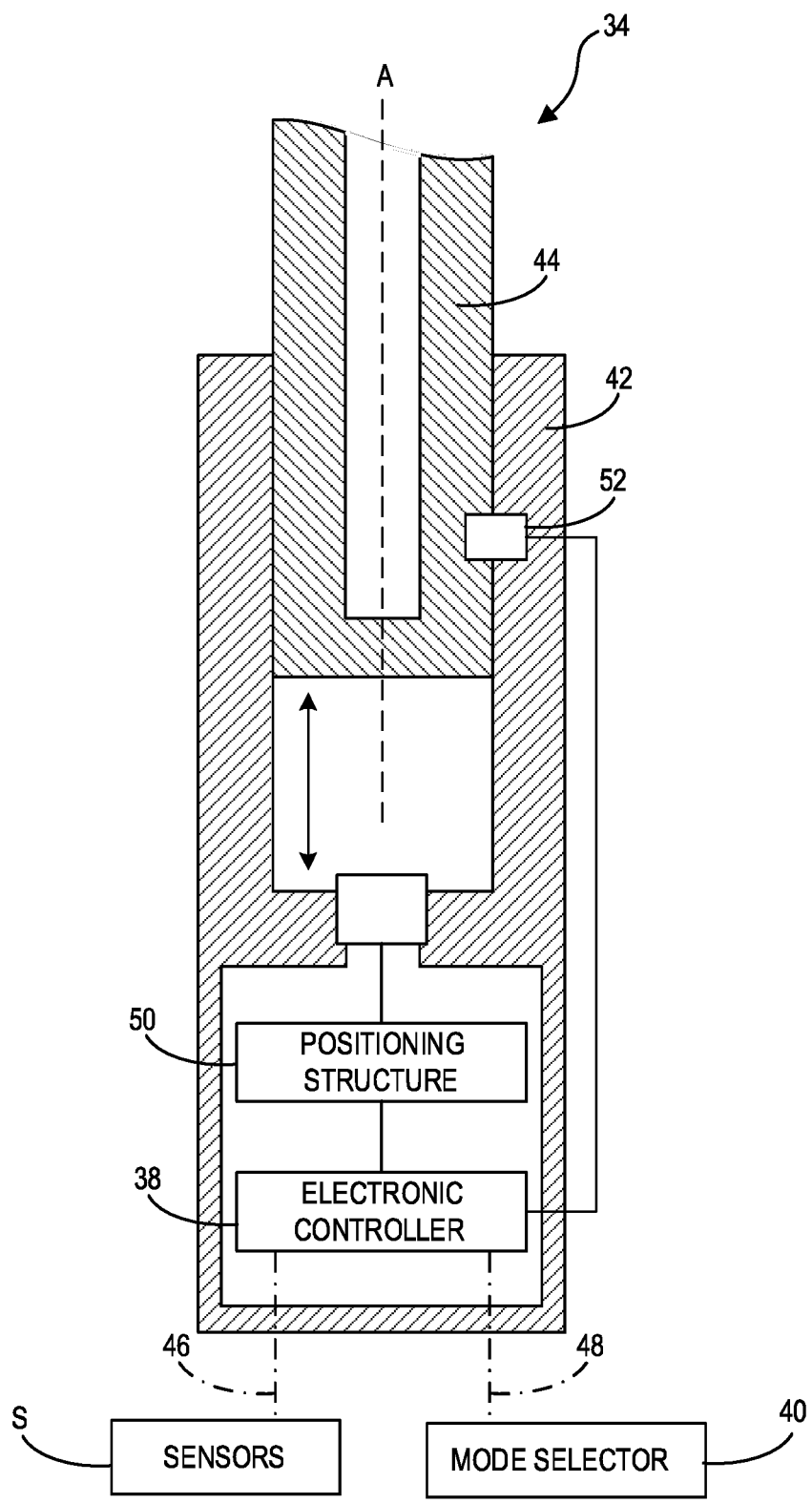
FIG. 2 is a schematic block diagram of the telescopic apparatus according to the present disclosure.

Turning to FIG. 2, a schematic illustration of the telescopic apparatus 34 according to the present disclosure is shown. The telescopic apparatus 34 includes a first tube 42 and a second tube 44, which is telescopically moved with respect to the first tube 42, as indicated by the two-way arrow. The first tube 42 is an outer tube, and the second tube 44 is an inner tube configured to be adjustably movable with respect to the first tube 42 in a longitudinal, or axial, direction of the telescopic apparatus 34, which is defined by a longitudinal center axis A indicated by the dashed line. Thus, the first tube 42 functions as a cylinder and the second tube 44 functions as a piston.

As described in detail below, the telescopic arrangement of the second tube 44 within the first tube 42 allows the length of the telescopic apparatus 34 to be adjusted by the electronic controller 38 according to the operating condition OC of the human-powered vehicle 10, as detected by at least one sensor S. In some embodiments, the first tube 42 and the second tube 44 cannot slide relative to one another unless the telescopic apparatus 34 is in an unlocked, or open, state as discussed further below. In other embodiments, the telescopic apparatus 34 can be in an intermediate state in which the second tube 44 is moveable with respect to the first tube 42, but with a greater resistance than in the open state. Further, one of the first tube 42 and the second tube 44 can be fixed with respect to the frame 12. The first tube 42 and the second tube 44 are preferably made of rigid material such as steel, aluminum alloy, or carbon reinforced material.

As discussed above, the electronic controller 38 is configured to selectively control the telescopic apparatus 34 of the human-powered vehicle 10 in accordance to the detected operating condition OC. The electronic controller 38 can be in communication with the at least one sensor S and the mode selector 40, which can be configured to transmit signals to the electronic controller 38 to indicate an operating condition OC of the human-powered vehicle 10. In the embodiment illustrated in FIG. 2, the electronic controller 38 is configured to communicate wirelessly with the at least one sensor S and the mode selector 40, respectively, as indicated by a dashed dot lines 46 and 48. Alternatively, the electronic controller 38 can be configured to communicate with the at least one sensor S and the mode selector 40 by a cable or the like.

As shown in FIG. 2, the electronic controller 38 can be arranged in the telescopic apparatus 34, and can be in communication with a positioning structure 50 to control the relative positional relationship between the first tube 42 and the second tube 44 of the telescopic apparatus 34. The positioning structure 50 can include a hydraulic positioning structure, for example, and the telescopic apparatus 34 can be controlled by opening and closing a valve of the hydraulic positioning structure. Alternatively, the positioning structure 50 can be configured as a motor-driven positioning mechanism that can be employed to drive one of the first tube 42 and the second tube 44 to move longitudinally with respect to the other of the first tube 42 and the second tube 44 according to electronic instructions signals. The telescopic apparatus 34 can further include a position sensor 52 to detect the predetermined relative position between the first tube 42 and the second tube 44 in the longitudinal direction of the telescopic apparatus 34. The position sensor 52 can be implemented as one of a pressure sensor, such as a hydraulic or pneumatic pressure sensor, an optical sensor, or a non-contact sensor, such as a non-contact encoder, a laser sensor, or an ultrasonic sensor, for example. The position sensor 52 can output a signal to the electronic controller 38 to indicate the relative position of the first tube 42 and the second tube 44 of the telescopic apparatus 34.

Figure 3:
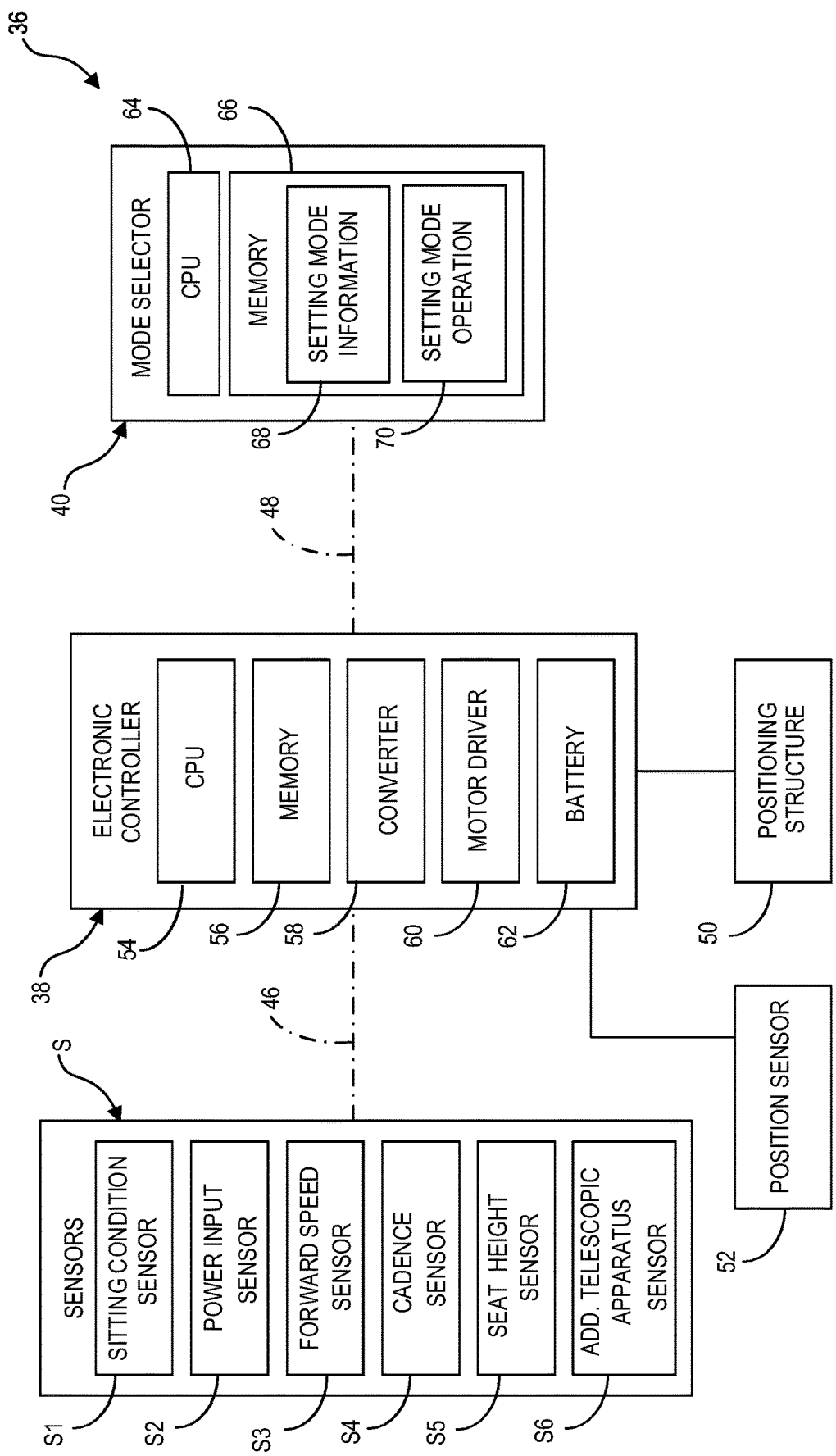
FIG. 3 is a schematic block diagram of the control device of the telescopic apparatus according to the present disclosure.

FIG. 3 shows a schematic block diagram of the control device 36. As described above, the control device 36 comprises at least one sensor S, the electronic controller 38, and the mode selector 40. As described above, the at least one sensor S is configured to detect the operating condition OC of the human-powered vehicle 10. The operating condition OC includes at least two of a sitting condition of the rider, a power input to the human-powered vehicle 10, and a forward speed of the human-powered vehicle 10. Accordingly, with reference to FIG. 1, the at least one sensor S includes a pressure sensor S1 arranged on or inside the seat 30 to detect a first operating condition OC1 that indicates the sitting position of the rider. It will be appreciated that the sensor 51 can be a type of sensor other than a pressure sensor, such as a non-contact sensor as an optical sensor or a non-contact sensor, as described above. With continued reference to FIG. 1, the at least one sensor S further includes a sensor S2 mounted on or inside the crank 24 of the human-powered vehicle 10 to detect a second operating condition OC2 that indicates the power input to the human-powered vehicle 10, and a sensor S3, such as a ground speed radar, for example, mounted on or inside the front wheel 18 to detect a third operating condition OC3 that indicates the forward speed of the human-powered vehicle 10. However, the sensor S3 is not limited to the embodiment, and might be change accordingly if needed and/or desired. For example, forward speed of the human-powered vehicle also can be detected by a multi-axis acceleration sensor that is configured to detect an acceleration of the human-powered vehicle in a vertical direction, and a forward speed of the human-powered vehicle in a forward or propulsion direction of the human-powered vehicle.

The operating condition of the human-powered vehicle 10 further includes an additional operating condition OC, and the additional operating condition OC includes at least one of a cadence, a condition of an additional telescopic apparatus, and a seat height of the human-powered vehicle 10. In the field of human-powered vehicles, cadence is generally understood to mean the pedaling rate, which is the number of revolutions of the crank 24 per minute. Accordingly, and with continued reference to FIG. 1, the at least one sensor S includes a sensor S4 mounted on or inside the crank 24 of the human-powered vehicle 10 to detect a fourth operating condition OC4 that indicates the cadence of the rider of human-powered vehicle 10. It will be appreciated that the sensor S4 is not limited to a crank-based cadence meter and can be alternatively implemented as a pedal-based or a wheel-based cadence meter, although these are merely examples and not intended to be limiting. A sensor S5 mounted on or inside the seatpost 28, such as a pressure sensor or non-contact sensor, for example, is configured detect a fifth operating condition OC5 that indicates the seat height of the human-powered vehicle 10. Additionally, or alternatively, when the human powered vehicle is configured with the adjustable suspension 32, the at least one sensor S can be configured as a sensor S6 mounted on or inside the adjustable suspension 32 to detect a sixth operating condition OC6 that indicates a state of the adjustable suspension 32. In an example, the sensor could be one of a pressure sensor or a non-contact sensor (e.g. optical sensor, hall sensor, or the like).

As described above, the electronic controller 38 is configured to communicate with the position sensor 52 and the at least one sensor S to selectively control the telescopic apparatus 34 according to the operating condition OC of the human-powered vehicle 10. Accordingly, as further illustrated in FIG. 3, the electronic controller 38 of the telescopic apparatus 34 includes a microprocessor such as a CPU 54 that includes at least one processor and a memory 56. The CPU 54 processes position information of the telescopic apparatus 34 read from the position sensor 52 and the operating condition OC of the human-powered vehicle 10 detected by the at least one sensor S. The memory 56 of the electronic controller 38 stores programs and data related to the operating condition OC of the human-powered vehicle 10 and position information of the telescopic apparatus 34. The memory 56 is any computer storage device or any non-transitory computer-readable medium with the sole exception of a transitory, propagating signal. For example, the memory 56 includes a nonvolatile memory and a volatile memory. As described in detail below, the position information from the position sensor 52 can be applied to the operating condition OC detected by the at least one sensor S to control the telescopic apparatus 34 in accordance to a comparison between the operating condition OC and a threshold value or predetermined condition. The electronic controller 38 can include additional programs for performing tasks such as calibrating the sensors S and the position sensor 52. Further, the electronic controller 38 can include a network interface when a communication network is employed on the human-powered vehicle 10.

In some embodiments the electronic controller 38 can include an analog to digital converter 58. Accordingly, if the position sensor 52 and/or the at least one sensor S produces an analog signal, the electronic controller 38 can convert the analog signal to a digital signal via the converter 58. As discussed above, the positioning structure 50 can be configured as a hydraulic positioning structure, which can include an electrical actuator, or as a motor-driven positioning mechanism. Thus, the electronic controller 38 can additionally include a motor driver 60 that drives the positioning structure 50. A power source, illustrated as a battery 62 in the embodiment of FIG. 3, is provided in the electronic controller 38 to power the electrical actuator of the hydraulic positioning structure or the electric motor 52 of the motor-driver positioning structure.

As shown in FIG. 3, the electronic controller 38 is in wireless communication with the mode selector 40, as indicated by the dashed dot line 48. As discussed above, the mode selector 40 is configured to set the electronic controller 38 to select one of a plurality of setting modes SM. When the telescopic apparatus 34A is implemented as the adjustable suspension 32, the setting modes SM can include "sprint" and/or "descend," for example. When the telescopic apparatus 34B is implemented as the adjustable seatpost 28, the setting modes SM can include "preset/finite" and/or "stepless/infinite," for example. The mode selector 40 includes a CPU 64 that includes at least one processor to process input from the rider as it pertains to the plurality of setting modes SM, and memory 66 that is configured to store setting mode information 68 and instructions for executing a setting mode operation 70 for each of the plurality of setting modes SM. The memory 66 is any computer storage device or any non-transitory computer-readable medium with the sole exception of a transitory, propagating signal. For example, the memory 56 includes a nonvolatile memory and a volatile memory. As described below, each of the setting modes SM correlates to a different state of the telescopic apparatus 34, and the electronic controller 38 is configured to control the telescopic apparatus 34 in a manner that corresponds to the selected setting mode SM.

Figure 4:
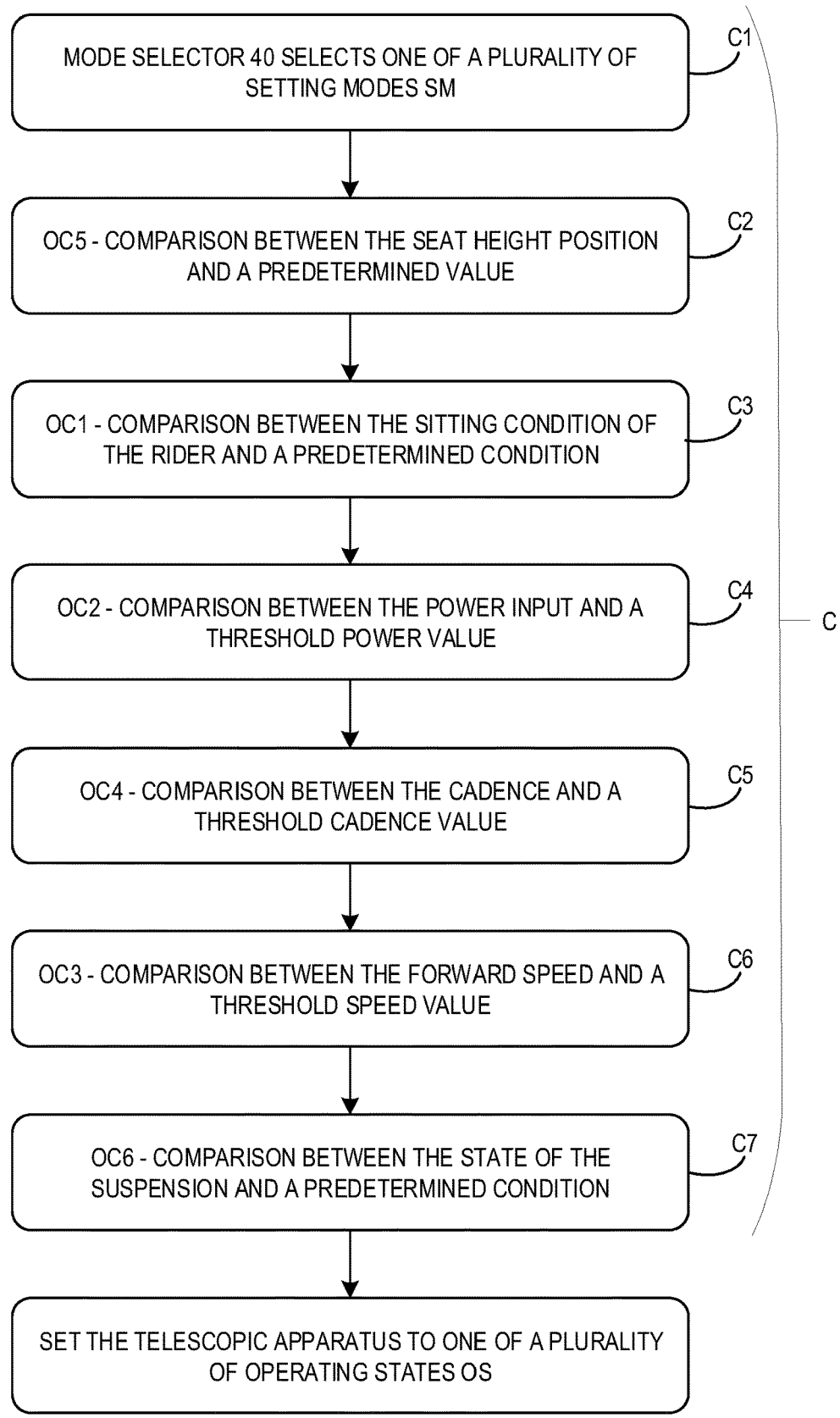
FIG. 4 is a flow chart of criteria that determine an operating state of the telescopic apparatus according to the present disclosure.

In FIG. 4, a flow chart of a control flow is illustrated, in which a plurality of control criteria C is evaluated and used to set an operating state OS of the telescopic apparatus 34. As described throughout the disclosure, the telescopic apparatus 34 is selectively controlled by the electronic controller 38 in accordance to a selected one of the setting mode SM and operating condition OC. The electronic controller 38 is configured to set the telescopic apparatus 34 to one of a plurality of operating states OS, as determined by a combination of the selected setting mode SM and operating condition OC. Accordingly, a first criteria C1 that determines the operating state OS is the selection of one of a plurality of setting modes SM by the mode selector 40. As described above and with reference to FIGS. 6 and 7, the mode selector 40 could select a setting mode SM such as SPRINT MODE (SM1) and/or DESCEND MODE (SM2), for example when the telescopic apparatus 34 is implemented as the adjustable suspension 32. Additionally, or alternatively, the mode selector 40 can include a PRESET/FINITE MODE and/or a STEPLESS/INFINITE MODE when the telescopic apparatus 34 is implemented as the adjustable seatpost 28.

Continuing on to the second criteria C2, the electronic controller 38 is configured to selectively control the telescopic apparatus 34 in accordance to a comparison between the seat height position and a predetermined position, which comprises the fifth operating condition OC5 described above. A value of this criteria C2 can be determined via a signal from the sensor S5 mounted on or inside the seatpost 28, which indicates the seat height of the human-powered vehicle 10.

The third criteria C3 that determines the operating state OS of the telescopic apparatus 34 is whether or not the rider of the human-powered vehicle 10 is sitting. As such, the electronic controller 38 is configured to selectively control the telescopic apparatus 34 in accordance to a comparison between the sitting condition of the rider and a predetermined condition, which corresponds to the first operating condition OC1 and can be determined via a signal from the pressure sensor S1 provided on or inside the seat 30, as described above.

Moving on to the fourth criteria C4, the electronic controller 38 is configured to selectively control the telescopic apparatus 34 in accordance to a comparison between the power input and a threshold power value TPV, which corresponds to the second operating condition OC2. A value of this criteria C4 can be determined via a signal from the sensor S2, which can be mounted on or inside the crank 24 of the human-powered vehicle 10 and detects the power input to the human-powered vehicle 10. Additionally, or alternatively, the sensor S2 can be implemented as a pedal-based or wheel-based power meter.

Proceeding to the fifth criteria C5, the electronic controller 38 is configured to selectively control the telescopic apparatus 34 in accordance to a comparison between the cadence and a threshold cadence value TCV. This criteria C5 corresponds to the fourth operating condition OC4, and a value of the criteria C5 can be determined via a signal from the sensor S4, which can be mounted on or inside the crank 24 of the human-powered vehicle 10 and detects the cadence of the human-powered vehicle 10. Additionally, or alternatively, the sensor S4 can be implemented as a pedal-based or wheel-based cadence meter. It will be appreciated that in some implementations, the criteria of power input and cadence can be measured with the same sensor S.

Continuing on to the sixth criteria C6, the electronic controller 38 is configured to selectively control the telescopic apparatus 34 in accordance to a comparison between the forward speed and a threshold speed value TSV, which comprises the third operating condition OC3 described above. A value of this criteria C6 can be determined via a signal from the sensor S3 mounted on or inside the front wheel 18 that indicates the forward speed of the human-powered vehicle 10. As described above, the sensor S3 can additionally or alternatively be implemented as a ground speed radar or a multi-axis acceleration sensor, for example.

The seventh criteria C7 that determines the operating state OS of the telescopic apparatus 34 is the state of the adjustable suspension 32. As such, the electronic controller 38 is configured to selectively control the telescopic apparatus 34 in accordance to a comparison between the state of the suspension 32 and a predetermined condition, which can be determined via a signal from the sensor S6 provided on or inside the adjustable suspension 32, as described above. In an example, the sensor S6 configured to measure a pneumatic pressure of the adjustable suspension 32. By measuring the pneumatic pressure, the condition of the adjustable suspension 32 can be determined, such as in open state or locked state. In other example, the sensor can be configured to measure a damper displacement or a linear movement of the adjustable suspension 32.

After determining values for the selected setting mode SM and operating conditions OC, the electronic controller 38 is configured to set the telescopic apparatus 34 to one of a plurality of operating states OS. The plurality of operating states OS includes a first operating state OS1, a second operating state OS2, and a third operating state OS3. In an example of the telescopic apparatus is an adjustable suspension 32, the first operating state OS1, the second tube 44 is restricted to move with respect to the first tube 42, thereby placing the telescopic apparatus 34 in a "locked" operating state. In the second operating state OS2, the second tube 44 is telescopically movable with respect to the first tube 42, and the telescopic apparatus 34 is in an "open" operating state. In the third operating state OS3, the second tube 44 is telescopically movable with respect to the first tube 42, and the second tube 44 moves with a greater resistance in the third operating state OS3 compared to a resistance of the second operating state OS2, thereby placing the telescopic apparatus 34 in an "intermediate" operating state. Thus, the first, second and third operating states are different operating states. The plurality of operating states OS can further include a fourth operating state OS4, a fifth operating state OS5, and a sixth operating state OS6 that pertain to predetermined set positions of the telescopic apparatus 34. In the fourth operating state OS4, the telescopic apparatus 34 is set to a first predetermined position PP1. In the fifth operating state OS5, the telescopic apparatus 34 is set to a second predetermined position PP2. In the sixth operating state, OS6, the telescopic apparatus is set to a third predetermined position PP3. In an example of an adjustable seatpost 28, each of the first predetermined position PP1, the second predetermined position PP2 and the third predetermined position PP3 can be interpreted as a high position, a low position and an intermediate position. It will be appreciated that the positions are merely an example, and could be adjusted to user's preferences respectively.

FIGS. 5, 6, 7 and 8 show flow charts for exemplary control flows of the control device 36 described herein. In each control flow, the criteria C1, C2, C3, C4, C5, C6 and C7, as described above with reference to FIG. 4, are evaluated. Values for each of the second, third, and fourth operating conditions OC2, OC3, and OC4 that indicate power input, forward speed, and cadence, respectively, are determined and compared to a threshold value. It will be appreciated that, with reference to FIGS. 5, 6, 7 and 8, exemplary values for power input are expressed in watts W, exemplary values for forward speed are expressed in miles per hour MPH, and exemplary values for cadence are expressed in rotations per minute RPM. Together, the combination of the outcomes of each criteria C determines the operating state OS of the telescopic apparatus 34. For the sake of simplicity, the implementations are described as methods, and the determination of each criteria C is represented by a step. Each operating condition OC is grouped by its respective criteria C according to FIG. 4, and the criteria groups are indicated in FIGS. 5, 6, 7, and 8 by dashed boxes. The outcome of each criteria C is detected by its respective sensor S and communicated to the electronic controller 38, as described above.

Figure 5:
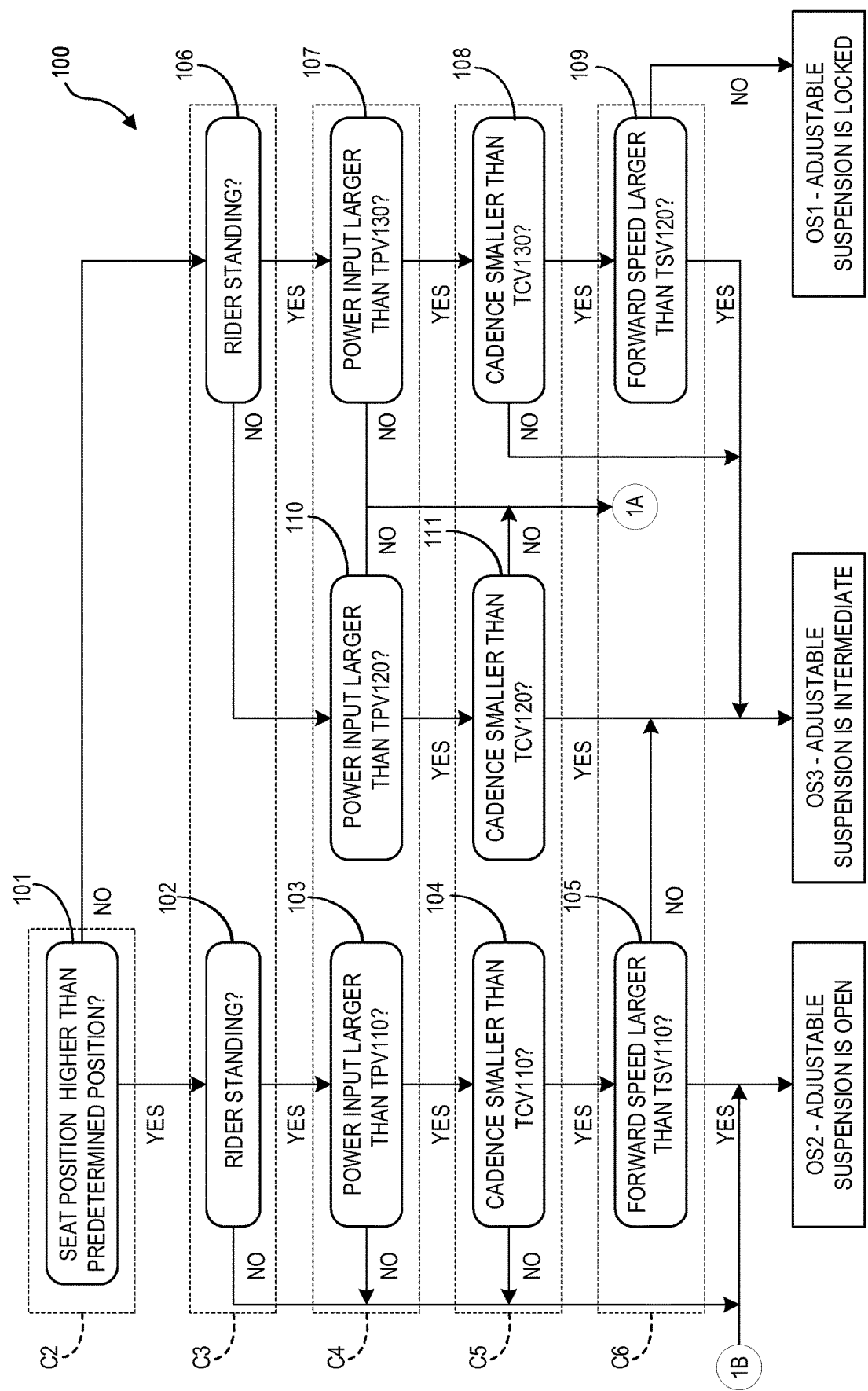
FIG. 5 is a method for first implementation of a control device according to the present disclosure.

Turning to FIG. 5, a method 100 for determining a first implementation of the control device 36 is illustrated. In the first implementation, the adjustable suspension 32 is the telescopic apparatus 34A. The method 100 describes how the control device 36 selectively controls the telescopic apparatus 34 when the rider is operating the human-powered vehicle 10 in Enduro-style racing conditions, for example.

At the first step 101 of the method 100, it is determined if the seat position is higher than a predetermined position. If the outcome of step 101 is YES, then the method 100 proceeds to step 102, which determines if the rider is standing up on the pedals 22. If the outcome of step 102 is YES, then the method 100 proceeds to step 103, which determines if the power input is larger than a threshold power value TPV110. The threshold power value TPV110 can be in a range of 175 W to 225 W. Specifically, the threshold power value TPV110 can be 200 W. If the outcome of step 103 is YES, then the method 100 proceeds to step 104, which determines if the cadence is smaller than a threshold cadence value TCV110. The threshold cadence value TCV110 can be in a range of 70 RPM to 80 RPM. Specifically, the threshold cadence value TCV110 can be 75 RPM. If the outcome of step 104 is YES, then the method 100 proceeds to step 105, which determines if the forward speed is larger than a threshold speed value TSV110. The threshold speed value TSV110 can be in a range of 15 MPH to 25 MPH. Specifically, the threshold speed value TSV110 can be 20 MPH. If the outcome to step 105 is YES, then the control device 36 controls the adjustable suspension 32 to be in the open operating state OS2, as described above.

After determining that the outcome to step 101 is YES, if the outcome of any of steps 102, 103, and/or 104 is NO, then the method 100 proceeds directly to the control device 36 controlling the adjustable suspension 32 to be in an open operating state OS2.

If the outcomes to steps 101, 102, 103, and 104 are YES, but the outcome to step 105 is NO, then the control device 36 controls the adjustable suspension 32 to be in the intermediate operating state OS3, as described above.

Returning to the first step 101, if the outcome of step 101 is NO, then the method 100 proceeds to step 106, which determines if the rider is standing up on the pedals 22. If the outcome of step 106 is YES, then the method 100 proceeds to step 107, which determines if the power input is larger than a threshold power value TPV130. The threshold power value TPV130 can be in a range of 175 W to 225 W. Specifically, the threshold power value TPV130 can be 200 W. If the outcome of step 107 is YES, then the method 100 proceeds to step 108, which determines if the cadence is smaller than a threshold cadence value TCV130. The threshold cadence value TCV130 can be in a range of 70 RPM to 80 RPM. Specifically, the threshold cadence value TCV130 can be 75 RPM. If the outcome of step 108 is YES, then the method 100 proceeds to step 109, which determines if the forward speed is larger than a threshold speed value TSV120. The threshold speed value TSV120 can be in a range of 5 MPH to 15 MPH. Specifically, the threshold speed value TSV120 can be 10 MPH. If the outcome to step 109 is YES, then the control device 36 controls the adjustable suspension 32 to be in the intermediate operating state OS3.

If the outcome of step 101 is NO, the outcomes of steps 106, 107, and 108 are YES, and the outcome of step 109 is NO, then the control device 36 controls the adjustable suspension to be in the locked operating state OS1, as described above.

If the outcomes of steps 101 and 106 are NO, then the method 100 proceeds to step 110, which determines if the power input is larger than a threshold power input TPV120. The threshold power value TPV120 can be in a range of 175 W to 225 W. Specifically, the threshold power value TPV120 can be 200 W. If the outcome of step 110 is YES, then the method proceeds to step 111, which determines if the cadence is smaller than a threshold cadence value TCV120. The threshold cadence value TCV120 can be in a range of 70 RPM to 80 RPM. Specifically, the threshold cadence value TCV120 can be 75 RPM. If the outcome to step 111 is YES, then the control device 36 controls the adjustable suspension 32 to be in the intermediate operating state OS3.

If the outcome of any of steps 107, 110, and/or 111 is NO, then the method 100 proceeds directly to the control device 36 controlling the adjustable suspension 32 to be in the open operating state OS2. For the sake of simplicity, the proceeding of the method 100 from NO determinations at any of steps 107, 110, and/or 111 to controlling the adjustable suspension 32 to be in the open operating state OS2 is indicated by jumping from 1A to 1B in FIG. 5.

If the outcome of step 101 is NO, the outcomes of steps 106 and 107 are YES, and the outcome of step 108 is NO, then the method proceeds directly to the control device 36 controlling the adjustable suspension 32 to be in the intermediate operating state OS3. Alternatively, it will be apparent from this disclosure that the adjustable suspension 32 can be controlled in the same manner if one or more of the steps in the method 100 are omitted if needed and/or desired. It will be appreciated that the threshold values can be customizable if needed and/or desired.

Figure 6:
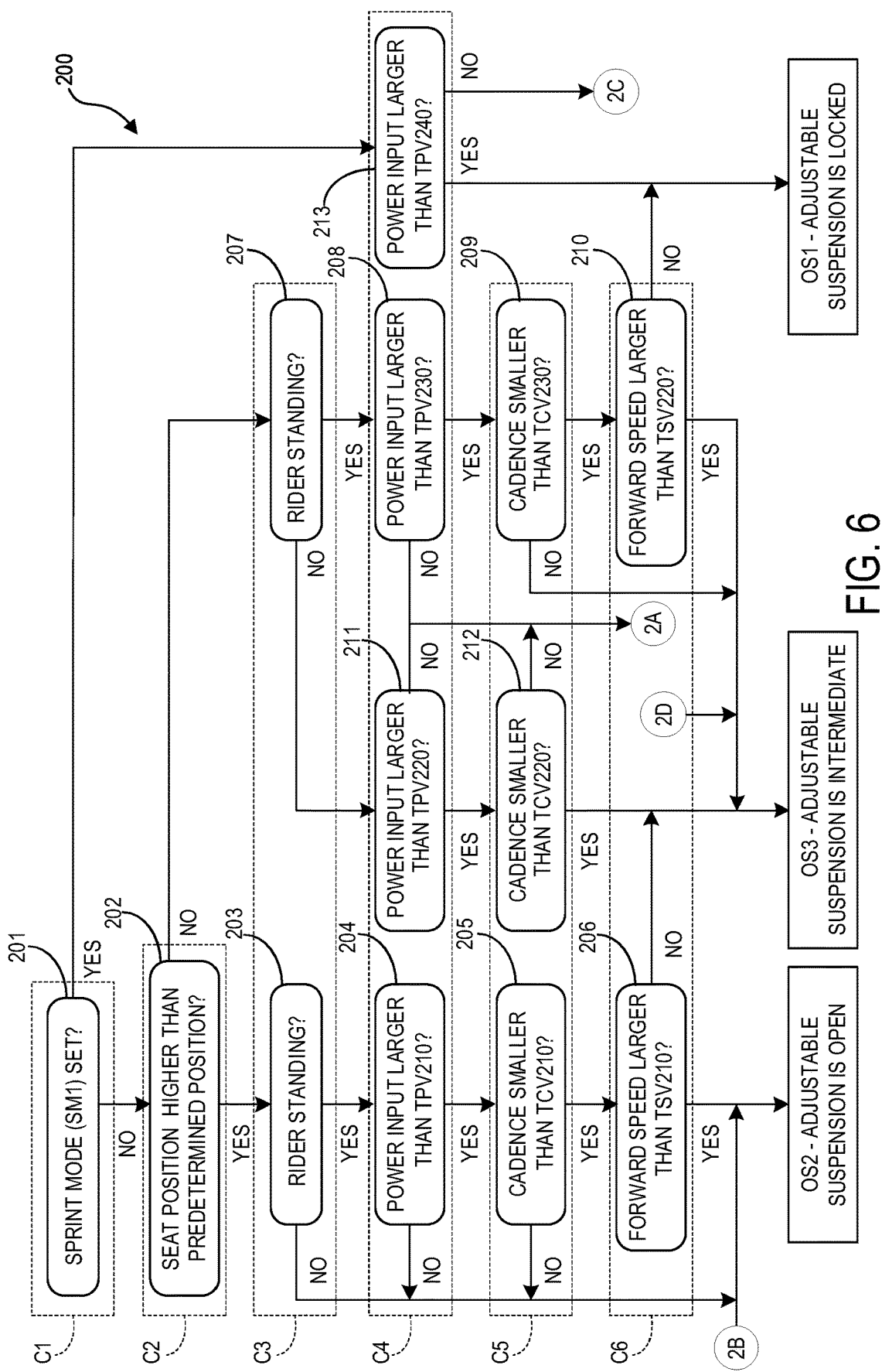
FIG. 6 is a method for a second implementation of the control device according to the present disclosure.

Turning to FIG. 6, a method 200 for determining a second implementation of the control device 36 is illustrated. In the second implementation, the adjustable suspension 32 is the telescopic apparatus 34A. The method 200 describes how the control device 36 selectively controls the telescopic apparatus 34 when the rider is operating the human-powered vehicle 10 in cross-country racing conditions with an adjustable seatpost 28, for example.

At the first step 201 of the method 200, it is determined if the sprint mode SM1 is set on the mode selector 40. If the outcome of step 201 is NO, then the method 200 proceeds to step 202, which determines if the seat position is higher than a predetermined seat position. If the outcome of step 202 is YES, then the method 200 proceeds to step 203, which determines if the rider is standing up on the pedals 22. If the outcome of step 203 is YES, then the method 200 proceeds to step 204, which determines if the power input is larger than a threshold power value TPV210. The threshold power value TPV210 can be in a range of 75 W to 125 W. Specifically, the threshold power value TPV210 can be 100 W. If the outcome of step 204 is YES, then the method 200 proceeds to step 205, which determines if the cadence is smaller than a threshold cadence value TCV210. The threshold cadence value TCV210 can be in a range of 70 RPM to 80 RPM. Specifically, the threshold cadence value TCV210 can be 75 RPM. If the outcome of step 205 is YES, then the method 200 proceeds to step 206, which determines if the forward speed is larger than a threshold speed value TSV210. The threshold speed value TSV210 can be in a range of 15 MPH to 25 MPH. Specifically, the threshold speed value TSV210 can be 20 MPH. If the outcome to step 206 is YES, then the control device 36 controls the adjustable suspension 32 to be in the open operating state OS2, as described above.

After determining that the outcome to step 202 is YES, if the outcome of any of steps 203, 204, and/or 205 is NO, then the method 200 proceeds directly to the control device 36 controlling the adjustable suspension 32 to be in an open operating state OS2.

If the outcomes to steps 202, 203, 204, and 205 are YES, but the outcome to step 206 is NO, then the control device 36 controls the adjustable suspension 32 to be in the intermediate operating state OS3, as described above.

Returning to the second step 202, if the outcome of step 202 is NO, then the method 200 proceeds to step 207, which determines if the rider is standing up on the pedals 22. If the outcome of step 207 is YES, then the method 200 proceeds to step 208, which determines if the power input is larger than a threshold power value TPV230. The threshold power value TPV230 can be in a range of 75 W to 125 W. Specifically, the threshold power value TPV230 can be 100 W. If the outcome of step 208 is YES, then the method 200 proceeds to step 209, which determines if the cadence is smaller than a threshold cadence value TCV230. The threshold cadence value TCV230 can be in a range of 70 RPM to 80 RPM. Specifically, the threshold cadence value TCV230 can be 75 RPM. If the outcome of step 209 is YES, the method 200 proceeds to step 210, which determines if the forward speed is larger than a threshold speed value TSV220. The threshold speed value TSV220 can be in a range of 10 MPH to 20 MPH. Specifically, the threshold speed value TSV220 can be 15 MPH. If the outcome to step 210 is YES, then the control device 36 controls the adjustable suspension 32 to be in the intermediate operating state OS3.

If the outcome of step 202 is NO, the outcomes of steps 207, 208, and 209 are YES, and the outcome of step 210 is NO, then the control device 36 controls the adjustable suspension to be in the locked operating state OS1, as described above.

If the outcomes of steps 202 and 207 are NO, then the method 200 proceeds to step 211, which determines if the power input is larger than a threshold power input TPV220. The threshold power value TPV220 can be in a range of 125 W to 175 W. Specifically, the threshold power value TPV220 can be 150 W. If the outcome of step 211 is YES, then the method proceeds to step 212, which determines if the cadence is smaller than a threshold cadence value TCV220. The threshold cadence value TCV220 can be in a range of 80 RPM to 90 RPM. Specifically, the threshold cadence value TCV220 can be 85 RPM. If the outcome to step 212 is YES, then the control device 36 controls the adjustable suspension 32 to be in the intermediate operating state OS3.

If the outcome of any of steps 208, 211, and/or 212 is NO, then the method 200 proceeds directly to the control device 36 controlling the adjustable suspension 32 to be in the open operating state OS2. For the sake of simplicity, the proceeding of the method 200 from NO determinations at any of steps 208, 211, and/or 212 to controlling the adjustable suspension 32 to be in the open operating state OS2 is indicated by jumping from 2A to 2B in FIG. 6.

If the outcome of step 202 is NO, the outcomes of steps 207 and 208 are YES, and the outcome of step 209 is NO, then the method proceeds directly to the control device 36 controlling the adjustable suspension 32 to be in the intermediate operating state OS3.

Returning to the first step 201, if the outcome of step 201 is YES, then the method 200 proceeds to step 213, which determines if the power input is larger than a threshold power value TPV240. The threshold power value TPV240 can be in a range of 75 W to 125 W. Specifically, the threshold power value TPV240 can be 100 W. If the outcome of step 213 is NO, then the method 200 proceeds directly to the control device 36 controlling the adjustable suspension 32 to be in the intermediate operating state OS3. For the sake of simplicity, the proceeding of the method 200 from NO determination at step 213 to controlling the adjustable suspension 32 to be in the intermediate operating state OS3 is indicated by jumping from 2C to 2D in FIG. 6.

If the outcomes of steps 201 and 213 are YES, then the control device 36 controls the adjustable suspension to be in the locked operating state OS1. Alternatively, it will be apparent from this disclosure that the adjustable suspension 32 can be controlled in the same manner if one or more of the steps in the method 200 are omitted if needed and/or desired. It will be appreciated that the threshold values can be customizable if needed and/or desired.

Figure 7:
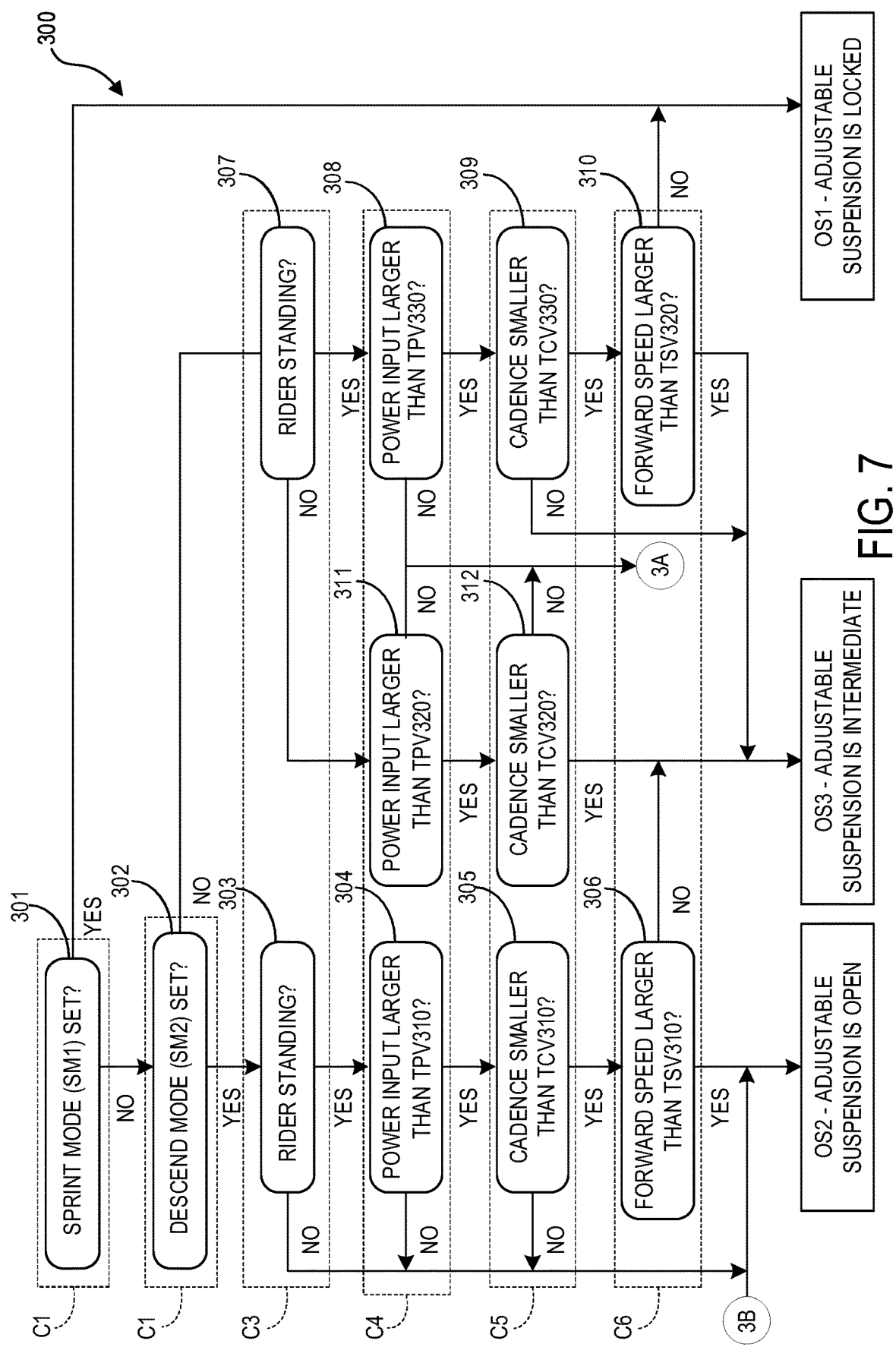
FIG. 7 is a method for a third implementation of the control device according to the present disclosure.

Turning to FIG. 7, a method 300 for determining a third implementation of the control device 36 is illustrated. In the third implementation, the adjustable suspension 32 is the telescopic apparatus 34A. The method 300 describes how the control device 36 selectively controls the telescopic apparatus 34 when the rider is operating the human-powered vehicle 10 in cross-country racing conditions without an adjustable seatpost 28, for example.

At the first step 301 of the method 300, it is determined if the sprint mode SM1 is set on the mode selector 40. If the outcome of step 301 is NO, then the method 300 proceeds to step 302, which determines if the descend mode SM2 is set on the mode selector 40. If the outcome of step 302 is YES, then the method 300 proceeds to step 303, which determines if the rider is standing up on the pedals 22. If the outcome of step 303 is YES, then the method 300 proceeds to step 304, which determines if the power input is larger than a threshold power value TPV310. The threshold power value TPV310 can be in a range of 125 W to 175 W. Specifically, the threshold power value TPV310 can be 150 W. If the outcome of step 304 is YES, then the method 300 proceeds to step 305, which determines if the cadence is smaller than a threshold cadence value TCV310. The threshold cadence value TCV310 can be in a range of 70 RPM to 80 RPM. Specifically, the threshold cadence value TCV310 can be 75 RPM. If the outcome of step 305 is YES, then the method 300 proceeds to step 306, which determines if the forward speed is larger than a threshold speed value TSV310. The threshold speed value TSV310 can be in a range of 15 MPH to 25 MPH. Specifically, the threshold speed value TSV310 can be 20 MPH. If the outcome to step 306 is YES, then the control device 36 controls the adjustable suspension 32 to be in the open operating state OS2, as described above.

After determining that the outcome to step 302 is YES, if the outcome of any of steps 303, 304, and/or 305 is NO, then the method 300 proceeds directly to the control device 36 controlling the adjustable suspension 32 to be in an open operating state OS2.

If the outcomes to steps 302, 303, 304, and 305 are YES, but the outcome to step 306 is NO, then the control device 36 controls the adjustable suspension 32 to be in the intermediate operating state OS3, as described above.

Returning to the second step 302 of the method 300, if the outcome of step 302 is NO, then the method 300 proceeds to step 307, which determines if the rider is standing up on the pedals 22. If the outcome of step 307 is YES, then the method 300 proceeds to step 308, which determines if the power input is larger than a threshold power value TPV330. The threshold power value TPV330 can be in a range of 125 W to 175 W. Specifically, the threshold power value TPV330 can be 150 W. If the outcome of step 308 is YES, then the method 300 proceeds to step 309, which determines if the cadence is smaller than a threshold cadence value TCV330. The threshold cadence value TCV330 can be in a range of 80 RPM to 90 RPM. Specifically, the threshold cadence value TCV330 can be 85 RPM. If the outcome of step 309 is YES, then the method 300 proceeds to step 310, which determines if the forward speed is larger than a threshold speed value TSV320. The threshold speed value TSV320 can be in a range of 15 MPH to 25 MPH. Specifically, the threshold speed value TSV320 can be 20 MPH. If the outcome to step 310 is YES, then the control device 36 controls the adjustable suspension 32 to be in the intermediate operating state OS3.

If the outcome of step 302 is NO, the outcomes of steps 307, 308, and 309 are YES, and the outcome of step 310 is NO, then the control device 36 controls the adjustable suspension to be in the locked operating state OS1, as described above.

If the outcomes of steps 302 and 307 are NO, then the method 300 proceeds to step 311, which determines if the power input is larger than a threshold power input TPV320. The threshold power value TPV320 can be in a range of 125 W to 175 W. Specifically, the threshold power value TPV320 can be 150 W. If the outcome of step 311 is YES, then the method proceeds to step 312, which determines if the cadence is smaller than a threshold cadence value TCV320. The threshold cadence value TCV320 can be in a range of 80 RPM to 90 RPM. Specifically, the threshold cadence value TCV320 can be 85 RPM. If the outcome to step 312 is YES, then the control device 36 controls the adjustable suspension 32 to be in the intermediate operating state OS3.

If the outcome of any of steps 308, 311, and/or 312 is NO, then the method 300 proceeds directly to the control device 36 controlling the adjustable suspension 32 to be in the open operating state OS2. For the sake of simplicity, the proceeding of the method 300 from NO determinations at any of steps 308, 311, and/or 312 to controlling the adjustable suspension 32 to be in the open operating state OS2 is indicated by jumping from 3A to 3B in FIG. 7.

If the outcome of step 302 is NO, the outcomes of steps 307 and 308 are YES, and the outcome of step 309 is NO, then the method proceeds directly to the control device 36 controlling the adjustable suspension 32 to be in the intermediate operating state OS3.

Returning to the first step 301, if the outcome of step 301 is YES, then the method 300 proceeds directly to the control device 36 controlling the adjustable suspension 32 to be in the locked operating state OS1. Alternatively, it will be apparent from this disclosure that the adjustable suspension 32 can be controlled in the same manner if one or more of the steps in the method 300 are omitted if needed and/or desired.

Figure 8:
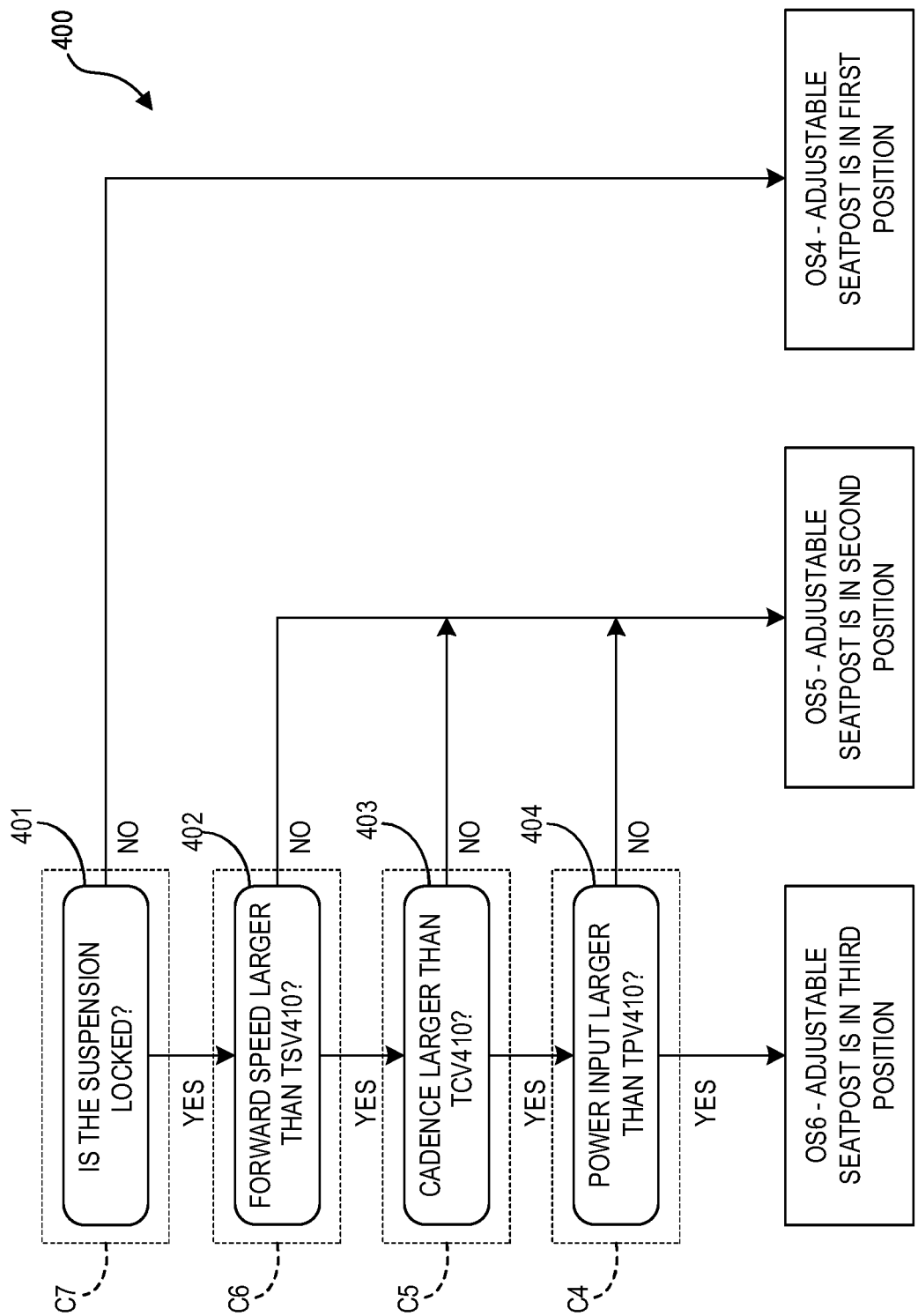
FIG. 8 is a method for a fourth implementation of the control device according to the present disclosure.

Moving to FIG. 8, a method 400 for determining a fourth implementation of the control device 36 is illustrated. In the fourth implementation, the adjustable seatpost 28 is the telescopic apparatus 34B. The method 400 describes how the control device 36 selectively controls the adjustable seatpost 28 when the rider is operating the human-powered vehicle 10 configured with an additional telescopic apparatus, such as an adjustable suspension 32, for example.

At the first step 401 of the method 400, it is determined if the condition of the additional telescopic apparatus is different than a predetermined condition. As such, at the first step 401 of the method 400, it is determined if the adjustable suspension is in a locked operating state OS1. If the outcome of step 401 is NO, then the method 400 proceeds directly to the control device 36 controlling the adjustable seatpost 28 in accordance with the fourth operating state OS4 in which the adjustable seatpost 28 is set to the first predetermined position PP1.

Returning to the first step 401, if the outcome of step 401 is YES, then the method 400 proceeds to step 402, which determines if the forward speed is larger than a threshold speed value TSV410. The threshold speed value TSV410 can be in a range of 5 MPH to 15 MPH. Specifically, the threshold speed value TSV410 can be 10 MPH. If the outcome of step 402 is YES, then the method 400 proceeds to step 403, which determines if the cadence is larger than a threshold cadence value TCV410. The threshold cadence value TCV410 can be in a range of 40 RPM to 60 RPM. Specifically, the threshold cadence value TCV410 can be 50 RPM. If the outcome of step 403 is YES, then the method 400 proceeds to step 404, which determines if the power input is larger than a threshold power value TPV410. The threshold power value TPV410 can be in a range of 60 W to 80 W. Specifically, the threshold power value TPV410 can be 70 W. If the outcome to step 404 is YES, then the control device 36 controls the adjustable seatpost 28 in accordance with the sixth operating state OS6 in which the adjustable seatpost 28 is set to the third predetermined position PP3. In this example, the third predetermined position PP3 is an intermediate position adjustably arranged between the first predetermined position PP1 and the second predetermined position PP2. The third predetermined position PP3 can be in a range of 2 mm to 8 mm. Specifically, the third predetermined position PP3 can be 5 mm adjustable from the first predetermined position PP1.

After determining that the outcome to step 401 is YES, if the outcome of any of steps 402, 403, and/or 404 is NO, then the method 400 proceeds directly to the control device 36 controlling the adjustable seatpost 28 in accordance with the fifth operating state OS5 in which the adjustable seatpost 28 is set to the second predetermined position PP2. Alternatively, it will be apparent from this disclosure that the adjustable seatpost 28 can be controlled in the same manner if one or more of the steps in the method 400 are omitted if needed and/or desired. It will be appreciated that the threshold values can be customizable if needed and/or desired.

In any of the implementations described herein, it will be appreciated that a control system 72A for the human-powered vehicle 10 can comprise the control device 36 according to the present disclosure, and the telescopic apparatus 34A can include the adjustable suspension 32. Additionally, or alternatively, the control system 72B for the human-powered vehicle 10 can comprise the control device 36 according to the present disclosure, and the telescopic apparatus 34B can include the adjustable seatpost 28. While only selected embodiments have been chosen to illustrate the present invention, it will be apparent to those skilled in the art from this disclosure that various changes and modifications can be made herein without departing from the scope of the invention as defined in the appended claims. For example, the size, shape, location, or orientation of the various components can be changed as needed and/or desired. Components that are shown directly connected or contacting each other can have intermediate structures disposed between them. The functions of one element can be performed by two elements, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An adjustable seatpost controller for controlling an adjustable seatpost of a human-powered vehicle, the adjustable seatpost controller comprising:
   at least one sensor configured to detect an operating condition of the human-powered vehicle, the operating condition including at least two of a sitting condition of a rider, a power input to the human-powered vehicle, and a forward speed of the human-powered vehicle;
   an electronic controller configured to selectively control the adjustable seatpost of the human-powered vehicle in accordance to the operating conditions; and
   a mode selector configured to set the electronic controller to select one of a plurality of setting modes, each of the setting modes correlating to a different state of the adjustable seatpost, and
   the electronic controller being configured to control the adjustable seatpost in a manner that corresponds to a selected one of the setting modes.

2. The adjustable seatpost controller according to claim 1, wherein
   the electronic controller is configured to selectively control the adjustable seatpost in accordance to a comparison between the sitting condition of the rider and a predetermined condition.

3. The adjustable seatpost controller according to claim 1, wherein
   the electronic controller is configured to selectively control the adjustable seatpost in accordance to a comparison between the power input and a threshold power value.

4. The adjustable seatpost controller according to claim 1, wherein
  the electronic controller is configured to selectively control the adjustable seatpost in accordance to a comparison between the forward speed and a threshold speed value.

5. The adjustable seatpost controller according to claim 1, wherein
  the operating condition further includes an additional operating condition, the additional operating condition including at least one of a cadence, a condition of an additional telescopic apparatus, and a seat height of the human-powered vehicle.

6. The adjustable seatpost controller according to claim 5, wherein
  the electronic controller is configured to selectively control the adjustable seatpost in accordance to a comparison between the cadence and a threshold cadence value.

7. A control device for controlling a telescopic apparatus of a human-powered vehicle, the control device comprising:
  at least one sensor configured to detect an operating condition of the human-powered vehicle, the operating condition including at least two of a sitting condition of a rider, a power input to the human-powered vehicle, and a forward speed of the human-powered vehicle; and
  an electronic controller configured to selectively control the telescopic apparatus of the human-powered vehicle in accordance to the operating condition the operating condition further includes an additional operating condition, the additional operating condition including at least one of a cadence, a condition of an additional telescopic apparatus, and a seat height of the human-powered vehicle,
  the electronic controller being further configured to selectively control the telescopic apparatus in accordance to a comparison between the condition of the additional telescopic apparatus and a predetermined condition.

8. A control device for controlling a telescopic apparatus of a human-powered vehicle, the control device comprising:
  at least one sensor configured to detect an operating condition of the human-powered vehicle, the operating condition including at least two of a sitting condition of a rider, a power input to the human-powered vehicle, and a forward speed of the human-powered vehicle; and
  an electronic controller configured to selectively control the telescopic apparatus of the human-powered vehicle in accordance to the operating condition, the operating condition further including an additional operating condition, the additional operating condition including at least one of a cadence, a condition of an additional telescopic apparatus, and a seat height position of the human-powered vehicle,
  the electronic controller being configured to selectively control the telescopic apparatus in accordance to a comparison between the seat height position and a predetermined position.

9. The adjustable seatpost controller according to claim 1, wherein
  the electronic controller is configured to set the adjustable seatpost to one of a plurality of operating states.

10. A control system comprising the adjustable seatpost controller according to claim 1, and further comprising:
  the adjustable seatpost configured to be operated by the adjustable seatpost controller.

11. A telescopic apparatus controller for controlling a telescopic apparatus of a human-powered vehicle, the telescopic apparatus controller comprising:
  at least one sensor configured to detect operating conditions of the human-powered vehicle, the operating condition including at least two of a sitting condition of a rider, a power input to the human-powered vehicle, and a forward speed of the human-powered vehicle;
  an electronic controller configured to selectively control the telescopic apparatus of the human-powered vehicle in accordance to the operating conditions; and
  a mode selector configured to set the electronic controller to select one of a plurality of setting modes, each of the setting modes correlating to a different state of the telescopic apparatus, and
  the electronic controller being configured to control the telescopic apparatus in a manner that corresponds to the selected setting mode.

12. A control system comprising the telescopic apparatus controller according to claim 11, and further comprising:
  an adjustable suspension as the telescopic apparatus which is configured to be operated by the telescopic apparatus controller.

13. A control device for controlling a telescopic apparatus of a human-powered vehicle, the control device comprising:
  at least one sensor configured to detect an operating condition of the human-powered vehicle, the operating condition including at least two of a sitting condition of a rider, a power input to the human-powered vehicle, and a forward speed of the human-powered vehicle; and
  an electronic controller configured to selectively control the telescopic apparatus of the human-powered vehicle in accordance to the operating condition, the electronic controller being further configured to set the telescopic apparatus to one of a plurality of operating states, the plurality of operating states including a first operating state, a second operating state, and a third operating state, the first, second and third operating states are different operating states.

14. The control device according to claim 13, wherein
  the telescopic apparatus includes a first tube and a second tube telescopically moved with respect to the first tube, and
  the second tube is restricted to move with respect to the first tube in the first operating state.

15. The control device according to claim 14, wherein
  the second tube is telescopically movable with respect to the first tube in the second operating state.

16. The control device according to claim 14, wherein
  the second tube is telescopically movable with respect to the first tube in the third operating state; and
  the second tube moves with a greater resistance in the third operating state compared to a resistance of the second operating state.

* * * * *